Patented Mar. 10, 1942

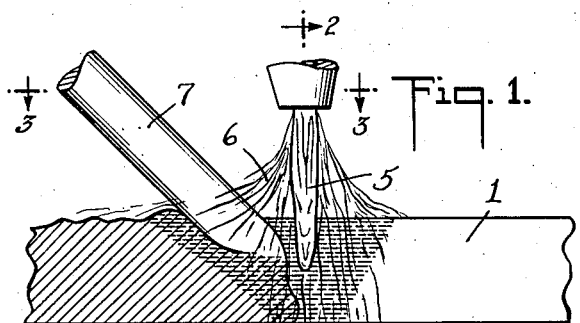
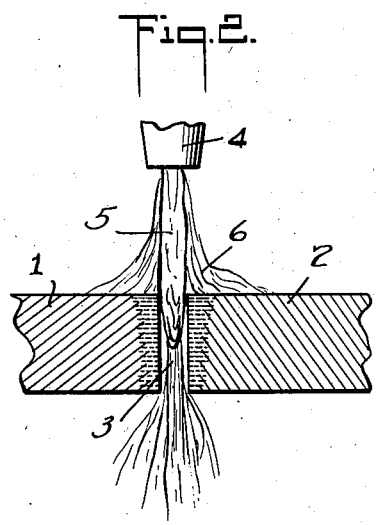
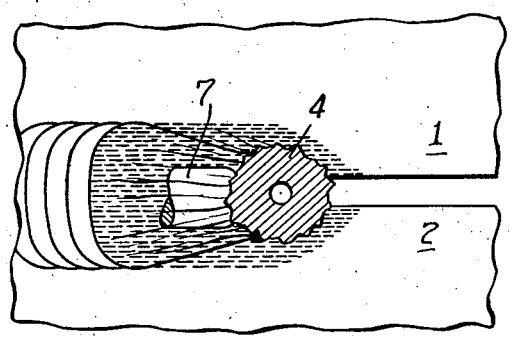
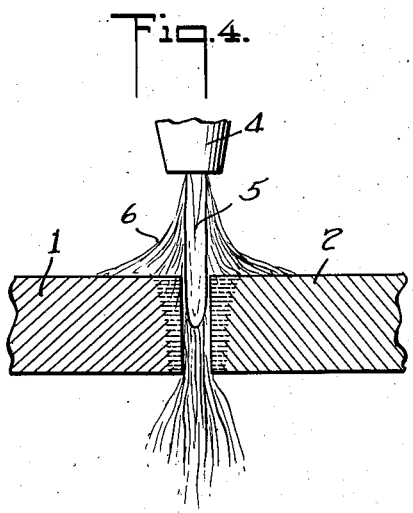
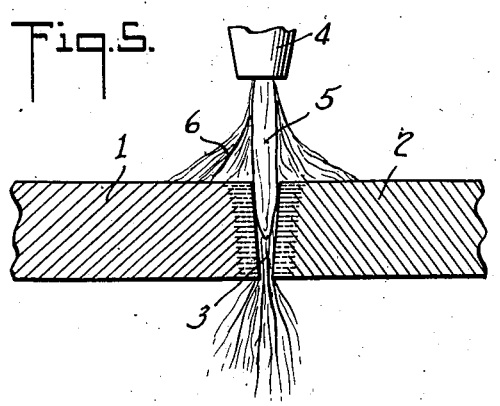

2,276,190

UNITED STATES PATENT OFFICE 2,276,190

METHOD OF WELDING WITH GAS

Anders Rudolf Gunnert, Lidingo, Sweden, assignor to Svenska Aktiebolaget Gasaccumulator, Stockholm, Sweden, a corporation of Sweden Application July 6, 1939, Serial No. 282,970
In Sweden July 14, 1938

1 Claim. (Cl. 113—112)

In butt welding with gas, either rightward welding, ordinary leftward welding, or vertical leftward welding has hitherto been practised. A characteristic feature of all these methods is that the welding flame is inclined towards the surface of the work piece. In the first-mentioned method, the flame is directed towards the completed weld, and in the two other methods, away from it. In rightward welding and ordinary leftward welding, the edges of the parts to be welded, in the following called "the plates," are chamfered at an angle of 30–45°. In vertical leftward welding, in which the weld is made vertically upwards, the edges of the plates are unchamfered, but this welding method is suitable only for a plate thickness of less than 6 mm.

In all welding, the surface of the plate edges are melted at the place where the filler metal is deposited in the gap between the edges. Theoretically, this fusion need only take place on the surface whereas deeper situated portions need not be melted. In practice, however, the inner portions are also subjected to a strong heat and partly melted, as it is impossible to melt the surface and maintain it in a melted state during the time required for depositing the filler metal without also heating the inner portions of the plates. The amount of heat thus transferred to the inner portions of the plates, as well as the amount of heat given off to the surrounding air, is an unavoidable loss, at least to a certain degree, and which should be kept as low as possible if the welding is to be economical. The surfaces of the plates should, therefore, be heated rapidly to melting temperature and the filler metal should be deposited quickly so that as small amount of heat as possible has time to be conducted to the inner portions of the plates. This amount of heat is determined, for a certain plate thickness and a certain size of blowpipe, by two factors, namely, the time required for heating the surface layer to melting point $t_1$ and the time during which the surface layer must be maintained in a molten state $t_2$. It is evident that the shorter these times, the more economical the welding.

The time $t_1$ is kept short if the heating effect of the flame on the plate edges is good, and the time $t_2$ will be short if the effect of the flame on the rod of filler material is good, or if a small quantity of filler metal is required. When the welding has proceeded so far that a state of continuance prevails, the flame heats simultaneously the plate surfaces in the gap and the welding rod constituting the filler metal. The two above-mentioned times $t_1$ and $t_2$ thus coincide and the time required for welding between two given points in the joint will not be the total of the times $t_1$ and $t_2$, but the longer of these. As a matter of fact, the welder tries to make these times equal in order to make the total welding time as short as possible. If he has a wide gap, which requires much filler metal, he holds the flame relatively far away from the plate surfaces in the gap and more concentrated on the rod, in order that, at the same time as the plate surfaces in the gap are being maintained in a melted state, he will get a sufficient quantity of melted filler metal to fill the gap. If he has a narrow gap, on the other hand, he holds the flame closer to the gap surfaces.

The present invention refers to a welding method which can be made considerably more economical than the methods hitherto known, as the welding time can be very much reduced. This method can be practised in welding in all directions and in all positions of the work, and it requires no other equipment than the one used in the usual welding methods. The new principal feature of the method consists in directing the flame substantially at right angles to the surface of the work, that is, at right angles to the longitudinal direction of the joint. In this way, the ability of the burning gases to pass through the gap between the plate edges is the greatest possible, and the gap can thus be made narrow and it is unnecessary to chamfer the plates. The relation between the ability of the flame to pass through a certain slot when its angle of inclination is $v$, and its ability to pass through the same opening at a right angle, is $\sin v/1$. The flame can thus, when at right angles to the joint, be carried deep down in the gap even if the gap is narrow, and in that way the hottest parts of the flame come as near to the edges of the gap as possible. The flame is hottest at a point along its center line just beyond the tip of the inner cone of the flame. This point thus comes closer to the surfaces in the gap, the narrower the gap is. From this it is evident that the emission of heat to the edges of the plates may be highly increased by directing the flame at a right angle, and in this way the time $t_1$ may be reduced, and the welding may be made correspondingly more economical. It has further been ascertained that the emission of heat from the flame to unchamfered edges, or edges chamfered only to a very steep angle, will be the greatest possible if the tip of the inner cone of the flame is kept at a distance below the top surface of the work which is more than one third of the plate thickness.

The fact that the gap may be narrow and with steep plate surfaces, also involves another advantage, namely, that a smaller amount of filler metal is required and thus also a smaller amount of heat for the melting of this material, which is more economical. The welding economy is, however also improved indirectly by the fact that the effect of the flame is more concentrated on the melting of the plate edges so that the welding time, and thus also the losses, are reduced. The reduced welding time also entails other advantages. If the weld is maintained in a melted state for a long time, this impairs its strength, and therefore the method according to this invention increases the strength of the weld, especially its impact resistance, and its ductility. As a smaller amount of filler metal is required, which is deposited in one run and all at once for the entire depth of the weld, very small deformations of the work result.

The present invention will be further described in the following, with reference to the attached drawing of which:

Fig. 1 is a cross-sectional view illustrating the improved method according to the present invention.

Fig. 2 is a cross-sectional view taken on the line 2—2 of Fig. 1.

Fig. 3 is a cross-sectional view taken on the line 3—3 of Fig. 1.

Fig. 4 is a view similar to Fig. 1, but showing another embodiment of my invention; and Fig. 5 shows a still further embodiment.

In the figures, the plates to be joined are indicated by reference characters 1 and 2, the plates being separated by a gap 3. A blowpipe nozzle 4 produces a flame having an inner cone 5 and an envelope 6 surrounding the inner cone. The welding rod is designated by reference character 7. The fused material is, in the figures, shown by horizontal dashes.

In the ordinary welding methods, the rightward welding method probably being most usual, the flame is held at a certain acute angle in relation to the work and with the tip of the inner cone 5 of the flame relatively far from the surfaces of the plate edges. The filler metal is to be deposited along the entire area between the surfaces, and the surface layer of the plate edges will be melted down to a relatively great depth. This means that a relatively great amount of material is maintained in a melted state simultaneously. This results in the welding methods hitherto known being uneconomical, and the tensile strength of joints made according to the said methods will not be as high as those of joints made according to the present invention.

According to the present invention, the nozzle 4 is held in such a position that the flame is at right angles to the gap, as is shown in Figs. 1 through 3. Due to the ability of the flame in this position to pass through a gap, the gap may be narrow and with substantially straight edges. The tip of the cone 5 of the flame is held within the gap at a distance below the upper surface of at least one-third the plate thickness. Due to the intense heat emitted by the cone, the surface layers of the plate edges are melted quickly, and hence only to a small depth, as appears from Fig. 2. Since a large part of the hot gases from the flame plays over the top surface, as shown in Fig. 2, the top surface and upper half of the plates become hotter than the bottom surface and lower half of the plates. Consequently, the flame melts the edges obliquely, as shown in Fig. 2. The flame should, therefore, especially if the plate is thin, that is, 6 mm. or less, be held with the tip of the inner cone at a distance below the top surface that is more than half the plate thickness rather than less than this. The deeper the flame is carried into the gap, the more heat will be concentrated on the plate edges, and the less heat will be available for melting of the filler metal. It is most economical to carry the flame deep down in the gap, but the difficulty of obtaining a homogeneous joint increases rapidly as the gap decreases.

To be able to have a narrow gap it is advisable to have a high rate of issue of the welding gases in the flame, that is a so-called hard flame. It should not, however, be so hard that the molten metal is blown away. For the welding of iron, a rate of issue of between 130 and 175 m./s. has proved to be suitable, the harder flame being suitable for thin plate, and the smaller rate of issue for thick plates. In welding with the gap in such a position that the gravity of the melted material and the pressure of the flame are not acting in the same direction to force the melted metal through the gap, somewhat higher speed of the gas is suitable.

The rod should be manipulated chiefly in the same manner as in the rightward welding, that is, in circular or elliptic movements in the molten weld metal. The flame, on the other hand, should be moved along the gap without lateral movement.

The flame makes a substantial enlargement of the gap just in front of the melted filler metal. Therefore, it is also possible to weld without a gap, that is, with the plates in contact, edge to edge, as shown in Fig. 4, in which case the flame cuts an opening for the gases. Instead of unchamfered plate edges, it is of course also possible to chamfer them slightly as shown in Fig. 5.

The welding method according to this invention may be employed in the welding of ferrous metals as well as of non-ferrous metals.

Although this method is chiefly intended for oxy-acetylene welding, it may be practised also in welding with fuel gases other than acetylene, such as oxy-hydrogen welding, oxy-benzoline welding, and the like.

This welding method is, as shown in the figures, applied in using a one-flame nozzle. The method may also be used, however, with a nozzle having several flames. If the flames are placed one after the other in the gap between the plates, an amount of heat more concentrated in the center of the gap will be obtained, and the gap can, therefore, be narrower than with one flame. This will also be the case if a flat flame extended in the lengthwise direction of the gap is used. In these cases, as when only one flame is used, a suitable guiding device for the blowpipe may be applied so that the flame, or flames, are kept in the middle of the gap. The welding rod, too, may be guided in a suitable manner and possibly also fed automatically.

This method is suitable for both hand-welding and machine-welding, either wholly automatic or semi-automatic.

Welding according to this method can be performed with a flame that is neutral or has either some excess of acetylene or some excess of oxygen. When using several flames, they may differ in this regard. The flames may also differ with regard to their hardness.

One or several smaller flames may be applied for preheating the welding rod. These may have another direction than the flames chiefly acting upon the plates, and it is not necessary that they have the tip of their inner cone lying below the plate surface.

What is claimed is:

The method of joining metal members having opposed substantially parallel steep edge surfaces, by means of butt welding with a gas flame and filler rod, that includes the following steps: maintaining the flow of gas delivered to said flame at a pressure to provide said flame with an inner elongated cone into which the gas issues at a velocity within a range of which the lower limit is of the order of 130 meters per second; maintaining said edge surfaces in spaced apart relationship at a distance substantially equal to the width of said cone to form a welding channel between said edge surfaces and to provide work surfaces on each side of said channel; maintaining the tip of said cone just in front of said rod and at a level at least substantially one-third of depth of said channel, maintaining said cone substantially normal to the longitudinal path of said channel and to said work surfaces, and concurrently advancing said cone and said rod along said channel.

ANDERS RUDOLF GUNNERT.